United States Patent [19]

Finkenzeller et al.

[11] Patent Number: 5,242,616
[45] Date of Patent: Sep. 7, 1993

[54] ELECTROOPTICAL LIQUID CRYSTAL SYSTEM

[75] Inventors: Ulrich Finkenzeller, Plankstadt; Dieter Dorsch, Ober-Ramstadt, both of Fed. Rep. of Germany

[73] Assignee: Merck Patent Gesellschaft mit beschrankter Haftung, Darmstadt, Fed. Rep. of Germany

[21] Appl. No.: 572,996
[22] PCT Filed: Jun. 6, 1990
[86] PCT No.: PCT/EP90/00891
  § 371 Date: Aug. 16, 1990
  § 102(e) Date: Aug. 16, 1990
[87] PCT Pub. No.: WO90/15854
  PCT Pub. Date: Dec. 27, 1990

[30] Foreign Application Priority Data

Jun. 19, 1989 [DE] Fed. Rep. of Germany ....... 3919942

[51] Int. Cl.$^5$ ............................................. C09K 19/52
[52] U.S. Cl. .................................................. 252/299.01
[58] Field of Search ............... 252/299.1; 359/52, 107, 359/104; 428/1

[56] References Cited

U.S. PATENT DOCUMENTS

| | | | |
|---|---|---|---|
| 4,671,618 | 6/1987 | Wu et al. | 359/52 |
| 4,688,900 | 8/1987 | Doane et al. | 359/52 |
| 4,944,576 | 7/1990 | Lacher et al. | 359/52 |
| 4,994,204 | 2/1991 | Doane et al. | 252/299.01 |
| 5,093,471 | 3/1992 | West | 252/299.01 |

Primary Examiner—Robert L. Stoll
Assistant Examiner—Shean C. Wu
Attorney, Agent, or Firm—Millen, White, Zelano & Branigan

[57] ABSTRACT

Electrooptical liquid crystal system [sic] containing nematic microdroplets which are embedded in a transparent matrix and consist of a liquid crystal mixture, characterized in that, to increase the flow viscosity to values >40 mm$^2$/s at 20° C., the liquid crystal mixture contains one or more side-chain polymers containing monomer units of the formula I

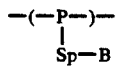

wherein
P is a main polymer chain unit,
Sp is an alkylene group having 1-20 C atoms, wherein one or more non-adjacent CH$_2$ groups can also be replaced by —O—, —S— and/or —NR$^2$—, and
B is an organic "rod-like" radical, can be used for the preparation of large-area display systems, in particular those operating with alternating voltage.

14 Claims, No Drawings

ELECTROOPTICAL LIQUID CRYSTAL SYSTEM

SUMMARY OF THE INVENTION

The invention relates to an electrooptical liquid crystal system containing nematic microdroplets which are embedded in a transparent matrix and consist of a liquid crystal mixture, characterized in that, to increase the flow viscosity to values >40 mm²/s at 20° C., the liquid crystal mixture contains one or more side-chain polymers containing monomer units of the formula I

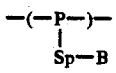

wherein
P is a main polymer chain unit,
Sp is an alkylene group having 1–20 C atoms, wherein one or more non-adjacent $CH_2$ groups can also be replaced by —O—, —S— and/or —$NR^2$—, and
B is an organic "rod-like" radical.

Such electrooptical liquid crystal systems contain nematic microdroplets which are embedded in a transparent matrix. The matrix is located sandwich-like between conductive electrodes. Examples of these systems are NCAP and PDLC films (NCAP=nematic curvilinear aligned phases, PDLC=polymer dispersed liquid crystal). NCAP films are usually obtained by intimately mixing the encapsulating polymeric material, such as, for example, polyvinyl alcohol, the liquid crystal mixture and a carrier material, such as, for example, water, in a colloid mill. The carrier material is then removed, for example by drying. A corresponding process is described in U.S. Pat. No. 4,435,047. In contrast, in the preparation of PDLC films which is described, for example, in EP 0,272,582 and U.S. Pat. No. 4,688,900, the liquid crystal mixture is first mixed homogeneously with monomers or oligomers of the matrix-forming material. The mixture is then polymerized and phase separation is induced, a distinction being made between TIPS (temperature-induced phase separation), SIPS (solvent-induced phase separation) and PIPS (polymerization-induced phase separation) (Mol. Cryst. Liq. Cryst. Inc. Nonlin. Opt. 157 (1988) 427).

The liquid crystal mixture in general has a positive dielectric anisotropy $\Delta\epsilon$ and a relatively high optical anisotropy $\Delta n$, and the ordinary refractive index $n_o$ is usually chosen so that it more or less coincides with the refractive index $n_M$ of the polymeric matrix.

A light scattering effect which can be switched electrically is observed on these electrooptical liquid crystal systems. If no voltage is applied to the electrodes, impinging light is scattered widely at the randomly aligned liquid crystal molecules and the system is opaque. When a voltage is applied, the liquid crystal molecules are aligned parallel to the field and perpendicular to the E vector of the light passing through. Because $n_M$ is adjusted to $n_o$, the impinging light now sees an optically isotropic medium and the system appears transparent. EP 0,272,585 describes another embodiment in which the refractive index $n_x$ which the liquid crystal has in completely random orientation is adjusted to the refractive index of the matrix $n_M$. In this case, the system is transparent in the fieldless state and is converted into the opaque state by application of a voltage.

Such systems have been proposed above all for large-area display systems, for architectonic uses (windows, room dividers, sun-roofs and the like) and for motor vehicles (windows, sun-roofs and the like). They can be switched by applying a direct or alternating voltage.

Since these systems are also intended in particular for "outdoor" uses, liquid crystal mixtures which are characterized by a high clear point, a wide nematic range and a high stability to UV and temperature are required.

Conventional electrooptical liquid crystal systems usually employ liquid crystal mixtures which consist of alkyl- or alkoxycyanobiphenyls and -terphenyls. The use of the liquid crystal mixture E8 (prepared by BDH, Poole, Great Britain) is thus described, for example, in U.S. Pat. No. 4,688,900 and in EP 0,272,585. This liquid crystal mixture is distinguished by a relatively high value for the flow viscosity of 54 mm²/s and a very high value for the optical anisotropy $\Delta n$ of 0.247, but at the same time has a relatively low clear point of only 72° C. If polynuclear polyphenyl compounds are added to the mixture to recover the clear point, the resulting value for the optical anisotropy $\Delta n$ is at an unchanged level or even higher. Although high $\Delta n$ values on the one hand ensure wide light scattering in the opaque state, on the other hand they cause clouding of the system in the switched state ("haze") and therefore a significant deterioration in the electrooptical properties.

Although the liquid crystal mixture E7 (prepared by BDH, Poole, Great Britain) which is used in U.S. Pat. No. 4,671,618 and likewise consists of alkyl- and alkoxycyanobiphenyls and -terphenyls has a somewhat lower optical anisotropy of $\Delta n=0.225$ than E8, at the same time the clear point $T_C=60.5°$ C. and the flow viscosity $\eta=39$ mm²/s at 20° C. are considerably lower. If the system is driven by an alternating voltage, however, the use of a highly viscous liquid crystal mixture is essential, since otherwise a flickering display results, especially at low to medium frequencies.

There is thus still a great demand for electrooptical liquid crystal systems which can be switched without flickering when an alternating voltage is applied and at the same time have a relatively high optical anisotropy $\Delta n$ and a high clear point $T_C$.

The invention was based on the object of providing electrooptical liquid crystal systems which do not have the abovementioned disadvantages of conventional systems or have them to only a minor degree.

Surprisingly, it has now been found that this object can be achieved if liquid crystal mixtures which contain one or more side-chain polymers are used for these systems.

The invention thus relates to an electrooptical liquid crystal system containing nematic microdroplets which are embedded in a transparent matrix and consist of a liquid crystal mixture, characterized in that, to the flow viscosity to values >40 mm²/s at 20° C., the liquid crystal mixture contains one or more side-chain polymers containing monomer units of the formula I

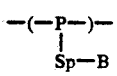

wherein
P is a main polymer chain unit,
Sp is an alkylene group having 1–20 C atoms, wherein one or more non-adjacent $CH_2$ groups can also be replaced by —O—, —S— and/or —$NR_2$—, and B is an organic "rod-like" radical.

The invention particularly relates to those electrooptical liquid crystal systems wherein B is a radical of the formula II

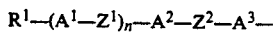

wherein $R^1$ is F, CN or an alkyl or alkenyl radical which has in each case 1-15 C atoms and is unsubstituted or substituted by CN or by at least one halogen atom and wherein one or more non-adjacent $CH_2$ groups can be replaced by O and/or S atoms and/or by —CO—, —O—CO—, —CO—O—, —O—CO—O—, —S—CO— and/or —CO—S— groups, $Z^1$ and $Z^2$ in each case independently of one another are —CO—O—, —O—CO—, —$CH_2CH_2$, —$CH_2O$—, —$OCH_2$—, —C≡C— or a single bond, $A^1$, $A^2$ and $A^3$ in each case independently of one another are a a) 1,4-cyclohexylene radical, wherein one or two non-adjacent $CH_2$ groups can be replaced by O atoms, b) 1,4-phenylene radical, wherein one or more CH groups can be replaced by N, c) radical from the group comprising 1,4-cyclohexenylene, piperidene-1,4-diyl, bicyclo(2,2,2)octylene, naphthalene-2,6-diyl, decahydronaphthalene-2,6-diyl, 1,2,3,4-tetrahydronaphthalene, 1,3-cyclobutylene and thiadiazole-2,5-diyl, it being possible for the radical b) to be substituted by one or two substituents from the group comprising F, Cl, CN and/or —$CH_3$, and n is 0, 1, 2 or 3.

The invention furthermore relates to those electrooptical liquid crystal systems in which an alternating voltage is applied to the electrodes to generate an electrical field.

The invention particularly relates to an electrooptical system in which the liquid crystal mixture contains at least one component chosen from the group comprising III and IV

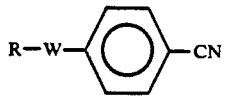

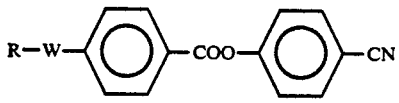

wherein

R in each case independently of one another is an alkyl group having 1-15 C atoms, wherein one or two non-adjacent $CH_2$ groups can also be replaced by —O—, —CO—, —COO—, —OOC— and/or —CH=CH—, and W is

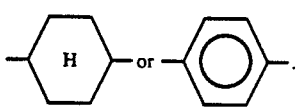

Those systems which are switched between the transparent and opaque state by applying an alternating voltage are preferred in this context. The dielectric anisotropy of the electrooptical PDLC systems according to the invention is positive and is preferably $\Delta\epsilon > 3$.

In a preferred embodiment of the invention, the liquid crystal mixture can contain a pleochroic dyestuff.

The invention furthermore relates to corresponding liquid crystal mixtures and the use of these liquid crystal mixtures in electrooptical liquid crystal systems.

The build-up of the electrooptical liquid crystal systems according to the invention corresponds to the construction customary for such systems: the matrix in which the liquid crystal mixture is microdispersed or microencapsulated is located sandwich-like between the conductive electrodes, which are provided with appropriate leads. At least one of the electrodes is applied to a transparent substrate of plastic, glass or a similar material, so that the system can be operated in the transmissive or reflective mode. The term customary construction is interpreted widely here and includes all variations and modifications.

Preferred embodiments of the electrooptical liquid crystal systems according to the invention are NCAP films, PDLC films and films of plastic produced by modified processes. Processes for the production of these films are described, for example, in U.S. Pat. Nos. 3,935,337, 4,688,900, 4,673,255, 4,671,618 and 4,435,047. However, other embodiments of the invention are also included.

However, an essential difference between the electrooptical liquid crystal systems according to the invention and the previously customary systems is the liquid crystal mixture used.

Liquid crystal media which have a viscosity $\eta > 40$ mm$^2$/s at 20° C. are employed in the electrooptical liquid crystal systems according to the invention. Liquid crystal mixtures having a viscosity $\eta > 50$ mm$^2$/s at 20° C. are particularly preferred here, and those having $\eta > 55$ mm$^2$/s at 20° C. are especially preferred. Such high viscosities are required so that these systems can be reliably switched without flickering when operated with an alternating voltage.

The liquid crystal media used in these systems furthermore have a relatively high optical anisotropy of between 0.05 and 0.22. Since a very high optical anisotropy $\Delta n$ on the one hand indeed causes wide light scattering in the fieldless state, but on the other hand causes clouding of the film ("haze") in the switched state, a range of between 0.05 and 0.20 is preferred for $\Delta n$. $\Delta n$ is particularly preferably between 0.05 and 0.17, but the range between 0.06 and 0.15 is especially favorable.

The liquid crystal media employed in these systems moreover have a high clear point of $T_C > 75°$ C. This is particularly important for architectonic "outdoor" uses. Clear points $T_C > 85°$ C. are particularly preferred.

The individual compounds of the formulae A-D and also other compounds which can be used in the electrooptical liquid crystal systems according to the invention are either known or can be prepared analogously to known compounds.

Preferred liquid crystal mixtures which can be used according to the invention contain in total side-chain polymers, in particular of the formula I. They preferably contain in total 5-30, in particular 9-22 components. Liquid crystal mixtures which contain at least one component each of the formulae III and IV are particularly preferred. Those mixtures which contain at a least one 4-alkyl- or 4-alkoxy-4'-cyanobiphenyl are furthermore preferred.

Above and below, $R^1$, $R^2$, $A^1$, $A^2$, $A^3$, $Z^1$, $Z^2$, P, Sp, B and An have the meaning given, unless something different is expressly used.

In the mesogenic radicals of the formula II, $R^1$ is preferably an alkyl or alkenyl radical which is unsubstituted or substituted by at least one halogen atom and wherein one or two non-adjacent $CH_2$ groups of these radicals can be replaced by O atoms and/or by —O—CO—, —CO—O— and/or —O—CO—O— groups.

Halogen is preferably F or Cl.

The mesogenic radicals of the formula II wherein $R^1$ is CN or F are furthermore preferred.

If $R^1$ is an alkyl or alkoxy radical, the latter can be straight-chain or branched. Preferably, it is straight-chain and has 2, 3, 4, 5, 6, 7 or 8 C atoms, and accordingly is preferably ethyl, propyl, butyl, pentyl, hexyl, heptyl, octyl, ethoxy, propoxy, butoxy, pentoxy, hexoxy, heptoxy or octoxy, or furthermore methyl, nonyl, decyl, undecyl, dodecyl, tridecyl, tetradecyl, pentadecyl, methoxy, nonoxy, decoxy, undexocy, dodecoxy, tridecoxy or tetradecoxy.

Oxaalkyl is preferably straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl.

If $R^1$ is an alkenyl radical, this can be straight-chain or branched. Preferably, it is straight-chain and has 2 to 10 C atoms. It is accordingly in particular vinyl, prop-1- or prop-2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl or dec-1-, -2-, -3-, -4-, -5-, -6-, -7-, -8- or -9-enyl.

Branched groups of this type as a rule contain not more than one chain branching. Preferred branched radicals $R^1$ are isopropyl, 2-butyl (=1-methylpropyl), isobutyl (=2-methylpropyl), 2-methylbutyl, isopentyl, (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methyloctoxy, 6-methyloctanoyloxy,5-methylheptyloxycarbonyl,2-methylbutyryloxy, 3-methylvaleryloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl and 2-methyl-3-oxahexyl.

The formula II includes both the racemates of these compounds and the pure enantiomers as well as mixtures thereof.

In the mesogenic radicals of the formula II, the groups $A^1$, $A^2$ and $A^3$ in each case independently of one another are preferably a 1,4-cyclohexylene radical, a 1,4-phenylene radical, a 2- or 3-fluoro-1,4-phenylene radical or a 2,3-difluoro-1,4-phenylene radical.

The groups $Z^1$ and $Z^2$ are preferably —CO—O—, —O—CO, —$CH_2CH_2$ or a single bond. The mesogenic radicals of the formula II preferably contain only one group $Z^1$ or $Z^2$ which differs from a single bond.

Amongst the mesogenic radicals of the formula II and all their part formulae, those in which at least one of the radicals contained therein has one of the preferred meanings stated are preferred.

A smaller group of mesogenic radicals of the formula II are the following mesogenic radicals of the formulae II1 to II4:

  II1

  II2

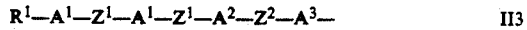  II3

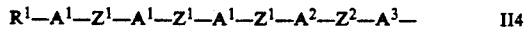  II4

Amongst these, those of the formula II1 are particularly preferred, especially those wherein $A^2$ and $A^3$ are 1,4-phenylene and/or 1,4-cyclohexylene and $Z^1$ is —COO—, —OCO—, —$CH_2$—$CH_2$— or a single bond.

Those side-chain polymers of the formula I wherein at least one of the groups $A^1$, $A^2$ and $A^3$ in the mesogenic radical of the formulae II, II1, II2, II3 and II4 is a 1,4-cyclohexylene group are particularly preferred.

In principle, all polymers in which the chains have a certain flexibility are possible as the polymeric backbone-(-P-) These can be linear, branched or cyclic polymer chains. The degree of polymerization is usually at least 10, preferably 20–300. However, oligomers containing 3 to 15, in particular 4 to 7 monomer units, are also possible.

Polymers having C-C main chains, in particular polyacrylates, -methacrylates, -α-halogenoacrylates, -α-cyanoacrylates, -acrylamides, -acrylonitriles or -methylenemalonates are preferably employed. Polymers having hetero atoms in the main chain, for example polyethers, -esters, -amides, -imides or -urethanes or in particular polysiloxanes, are furthermore also preferred.

Possible spacers in the polymers of the formula I according to the invention are above all alkylene groups having 2 to 20 C atoms, which can be linear or branched and in which one or more $CH_2$ groups can be replaced by —O—, —S— and/or —$NR^1$—.

Examples of possible spacers are: ethylene, propylene, butylene, pentylene, hexlene, octylene, decylene, undecylene, dodecylene, octadecylene, ethyleneoxyethylene, methyleneoxybutylene, ethylenethioethylene, ethylene-N-methyliminoethylene or 1-methylalkylene.

Those liquid crystal systems wherein the side-chain polymers of the formula I are copolymers having different "rod-like" radicals of the formula II are furthermore preferred, especially those copolymers wherein one comonomer has a "rod-like" radical of the formula IIa wherein $R^1$ is F or Cn (Co a) and the other comonomer contains a radical of the formula IIb which has a radical $R^1$ other than F or CN (Co b).

The ratio of the comonomers to one another is not critical here, and preferably between 10 parts and 1 part of comonomer (Co b) are copolymerized with 1 part of comonomer (Co a).

The side-chain polymers to be employed according to the invention are known or can be prepared by methods which are known per se (for example DE 2,722,589 and DE 3,817,088).

The liquid crystal mixtures which can be used according to the invention are prepared in a manner which is customary per se. As a rule, the desired amount of the components used in a smaller amount is dissolved in the components which make up the main constituent, advantageously at elevated temperature. It is also possible to mix solutions of the components in an organic solvent, for example in acetone, chloroform or methanol, and to remove the solvent again, for example by distillation, after thorough mixing.

The dielectrics can also contain other additives which are known to the expert and described in the literature. Electrooptical liquid crystal systems in which pleochroic dyestuffs are added in a percent by weight range of 0–15 % to the liquid crystal mixture are preferred.

EXAMPLES

The following examples are intended to illustrate the invention without limiting it.

The abbreviations have the following meanings:

G: Glassy state,
C: Crystalline-solid state,
S: Smectic phase (the index characterizes the phase type),
N: Nematic phase,
Ch: Cholesteric phase,
I: Isotropic phase.
$\eta$: Viscosity in mm$^2$/s at 20° C.
3,4-PCH-MA  Poly-[4-(4-(trans-4-propylcyclohexyl)-phenyloxy)-butyl]methacrylate
3,6-PCH-MA  Poly-[6-(4-(trans-4-propylcyclohexyl)-phenyloxy)-hexyl]methacrylate
5,4-PCH-MA  Poly-[4-(4-(trans-4-pentylcyclohexyl)-phenyloxy)-butyl]methacrylate
3,1,4-CCH-MA  Poly-[4-(trans,trans-4'-propylbicyclohexyl-4-ylmethyl)-butyl]methacrylate (3,4-PCH/N-4K)-MA  Poly-[4-(4-(trans-4-propylcyclohexyl)-phenyloxy)-butyl]-CO-[4-(4'-cyanobiphenyl-4-yl)-butyl]methacrylate The number between two symbols indicates the transition temperature in degrees Celsius.

The percentage figures stated are percentages by weight.

Example 1

In each case different amounts of a side-chain polymer are added to a mixture (A) consisting of
18% of p-(trans-4-propylcyclohexyl)-benzonitrile
14% of p-(trans-4-butylcyclohexyl)-benzonitrile
25% of p-(trans-4-pentylcyclohexyl)-benzonitrile
15% of p-(trans-4-heptylcyclohexyl)-benzonitrile
7% of 4-cyano-4'-(trans-4-pentylcyclohexyl)-biphenyl
6% of 4-cyano-4''-pentyl-p-terphenyl and
8of p-(trans-4-propylcyclohexyl)-phenyl (trans-4-butylcyclohexane)carboxylate
7% of 4-(trans-4-pentylcyclohexyl)-4-(trans-propylcyclohexyl)-biphenyl. and a mixture (B) consisting of 5% of p-(trans-4-ethylcyclohexyl)-benzonitrile
15% of p-(trans-4-propylcyclohexyl)-benzonitrile
11% of p-(trans-4-butylcyclohexyl)-benzonitrile
21% of p-(trans-4-pentylcyclohexyl)-benzonitrile
11% of p-(trans-4-heptylcyclohexyl)-benzonitrile
5% of trans-1-p-ethylphenyl-4-propylcyclohexane
12% of 4-ethyl-4'-(trans-4-propylcyclohexyl)-biphenyl
10% of 4-ethyl-4'-(trans-4-pentylcyclohexyl)-biphenyl
4% of 4-(trans-4-propylcyclohexyl)-4'-(trans-4-propylcyclohexyl)-biphenyl
6of 4-(trans-4-pentylcyclohexyl)-4'-(trans-4-propylcyclohexyl)-biphenyl.

As can be seen from Table 1, the viscosity increases greatly, whereas the other physical parameters hardly change.

TABLE I

| Example | Mixture (%) | Side-chain polymer 3,4-PCH-MA (%) | $\Delta n$ | Viscosity (20° C.) mm/sec$^2$ | Clear point (°C.) | $\Delta\epsilon$ |
|---|---|---|---|---|---|---|
| 1a | 100 (A) | 0 | 0.1426 | 30 | 92 | +11.8 |
| 1b | 99.5 (A) | 0.5 | 0.1442 | 34 | 85 | +11.8 |
| 1c | 99.0 (A) | 1.0 | 0.1439 | 40 | 85 | +11.7 |
| 1d | 98.0 (A) | 2.0 | 0.1436 | 73 | 84 | +11.6 |
| 1e | 95.0 (A) | 5.0 | 0.1417 | 320 | 83 | +11.6 |
| 1f | 90.0 (A) | 10.0 | 0.1388 | — | 81 | +11.6 |
| 1g | 100 (B) | 0 | 0.1322 | 21 | 85 | +10.0 |
| 1h | 99.5 (B) | 0.5 | 0.133 | 31 | 78.5 | +9.8 |
| 1i | 99.0 (B) | 1.0 | 0.133 | 40 | 78.6 | +9.7 |
| 1j | 98.0 (B) | 2.0 | 0.132 | 67 | 73.4 | +9.6 |
| 1k | 95.0 (B) | 5.0 | 0.131 | 186 | 73.0 | +9.3 |
| 1l | 90.0 (B) | 10.0 | 0.128 | 944 | 74.4 | +8.9 |

Example 2

In each case 5% of various side-chain polymers are added to a mixture (C) consisting of
12% of p-(trans-4-propylcyclohexyl)-benzonitrile
18% of p-(trans-4-pentylcyclohexyl)-benzonitrile
12% of p-(trans-4-heptylcyclohexyl)-benzonitrile
11% of trans,trans-4'-propyl-4-cyanobicyclohexyl
13% of trans,trans-4'-butyl-4-cyanobicyclohexyl
10% of trans,trans-4'-pentyl-4-cyanobicyclohexyl
6% of trans,trans-4'-heptyl-4-cyanobicyclohexyl
6% of p-(trans-4-propylcyclohexyl)-phenyl trans,-trans4'-propylbicyclohexyl-4-carboxylate
6% of p-(trans-4-butylcyclohexyl)-phenyl trans,trans4'-propylbicyclohexyl-4-carboxylate and
6% of p-(trans-4-pentylcyclohexyl)-phenyl trans,-trans4'-propylbicyclohexyl-4-carboxylate.

As can be seen from Table 2. the viscosity increases greatly, whereas the other physical parameters hardly change.

TABLE II

| Example | Side-chain polymer | Viscosity (10° C.) mm/sec$^2$ | $\Delta n$ | Clear point (°C.) | $\Delta\epsilon$ |
|---|---|---|---|---|---|
| 2a | — | 42 | 0.0937 | 96 | 7.7 |
| 2b | 3,6-PCH-MA | 529 | 0.0930 | 82.1 | 7.3 |
| 2c | 3,4-PCH-MA | 257 | 0.0932 | 82.0 | 7.4 |
| 2d | 3,4-PCH/N-4K-)MA* | 374 | 0.0939 | 82.9 | 7.4 |

*In this copolymer, the ratio of the two comonomers 4-(4-(trans-4-propylcyclohexyl)phenyloxy)-butyl methacrylate (3,4-PCH-MA) and 4-(4'-cyanobiphenyl-4-yl)-butyl methacrylate (N-4K-MA) is 4 to 1.

Example 3

A TN cell having a cell thickness of 7.41 μm and filled with a mixture A (Example 1) has the following threshold voltages at 20° C. and 60 Hz.

$V_{10}$ 1.80 V
$C_{50}$ 2.11 V
$V_{90}$ 2.65 V.

The mixtures doped according to Example 1d with 2.0% of the side-chain polymer 3,4-PCH-MA lead to the following threshold voltages:
$V_{10}$ 1.83 V
$V_{50}$ 2.13 V
$V_{90}$ 2.59 V.

Doping thus hardly any impact on the threshold voltage.

Example 4

An electrooptical liquid crystal system according to Example 1d (98% of mixture A, 2% of side-chain polymer 3,4-PCH-MA), prepared by the process described in EP-0.272,582, is located in matrix form between conductive electrodes and can be switched without flickering by applying an alternating voltage.

The electrooptical liquid crystal systems according to the invention are distinguished by the fact that during preparation of the system only a slight interaction, if any, between the components of the liquid crystal mixture and the polymeric carrier material takes place via polar groups.

The electrooptical liquid crystal systems according to the invention can be switched by applying a direct or alternating voltage. Preferably, however, an alternating voltage which has an alternating voltage amplitude of between 1 and 240 volts and an alternating voltage frequency of between 10 Hz and 10 kHz is used. Amplitudes of between 2 and 220 volts and frequencies of between 20 and 120 Hz are particularly preferred. The amplitude of the alternating voltage is especially preferably between 2 and 130 V.

The dielectric anisotropy of the liquid crystal mixture used is preferably positive, $\Delta\epsilon > 0$, and in particular $\Delta\epsilon > 3$. Very high response voltages are observed for smaller values of the dielectric anisotropy $\Delta\epsilon$. Values of $\Delta\epsilon > 5$ are particularly preferred.

We claim:

1. A liquid crystalline mixture comprising at least two components and exhibiting a flow viscosity of greater than 40 mm$^2$/s at 20° C., wherein at least one of said components is a side-chain polymer of formula I

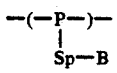

wherein
P is a main polymer chain unit;
Sp is an alkylene group having 1-20 C atoms, wherein one or more non-adjacent CH$_2$ groups can also be replaced by —O—, —S— and/or —NR$^2$—; and
B is an organic rod-like radical of formula II

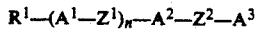

wherein
R$^1$ is F, CN or an alkyl or alkenyl radical which has in each case 1-15 C atoms and is unsubstituted or substituted by CN or by at least one halogen atom and wherein one or more non-adjacent CH$_2$ groups can be replaced by O and/or S atoms and/or by —C—, —O—CO—, —CO—O—, —O—CO—O—, —S—CO— and/or —CO—S— groups;

Z$^1$ and Z$^2$ in each case independently of one another are —CO—O—, —O—CO—, —CH$_2$CH$_2$—, —CH$_2$O—, —OCH$_2$—, —C≡C— or a single bond;
A$^1$, A$^2$ and A$^3$ in each case independently of one another are a
a) 1,4-cyclohexylene radical, wherein one or two non-adjacent CH$_2$ groups can be replaced by O atoms,
b) 1,4-phenylene radical, wherein one or more CH groups can be replaced by N,
c) radical from the group comprising 1,4-cyclohexenylene, piperidene-1,4-diyl, bicyclo-(2,2,2)octylene, naphthalene-2,6-diyl, decahydronaphthalene-2,6-diyl, 1,2,3,4-tetrahydronaphthalene, 1,3-cyclobutylene and thiadiazole-2,3-diyl,
it being possible for the radical b) to be substituted by one or two substituents from the group comprising F, Cl, CN and/or —CH$_3$; and
n is 0, 1, 2 or 3; and
said liquid crystalline mixture also contains at least one compound of formula III or formula IV

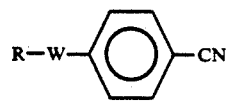

III

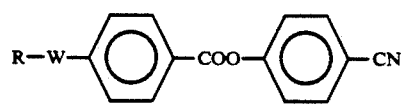

IV wherein
R in each case independently of one another is an alkyl group having 1-15 c atoms, wherein one or two non-adjacent CH$_2$ groups can also be replaced by —O—, —CO—, —COO—, —OOC— and/or —CH=CH—; and
W is

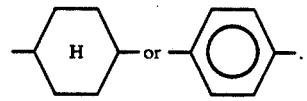

2. A liquid crystalline mixture according to claim 1, wherein said mixture contains 2-10% of side-chain polymers of formula I.

3. A liquid crystalline mixture according to claim 1, wherein said mixture has a dielectric anisotropy of $\Delta\epsilon > 3$.

4. A liquid crystalline mixture according to claim 1, wherein said mixture further contains a pleochroic dyestuff.

5. A liquid crystalline mixture according to claim 1, wherein the side-chain polymer contains monomer units having different rod-like radicals of formula II.

6. A liquid crystalline mixture according to claim 5, wherein the side-chain polymer contains at least one rod-like radical of formula II wherein R$^1$ is F or CN and at least one rod-like radical of formula II wherein R$^1$ is an alkyl or alkenyl radical which has in each case 1-15 C atoms and is unsubstituted or substituted by CN or at least one halogen atom and wherein one or more CH$_2$ groups can be replaced by O or S atoms or by —O—CO— or —CO—O—.

7. A liquid crystalline mixture according to claim 1, wherein the flow viscosity of said mixture is >50 mm²/s at 20° C.

8. A liquid crystalline mixture according to claim 1, wherein said mixture has an optical anisotropy Δn of 0.05–0.20.

9. A liquid crystalline mixture according to claim 1, wherein said mixture has a clearing point $T_C$ of greater than 75° C.

10. A liquid crystalline mixture according to claim 1, wherein the main polymer chain is a polyacrylate, polymethacrylate, poly-α-halogenoacrylate, poly-α-cyanoacrylate, polyacrylamide, polyacrylonitrile, polymethylenemalonate, polyether, polyester, polyamide, polyimide, polyurethane, or polysiloxane; and SP is ethylene, propylene, butylene, pentylene, hexylene, octylene, decylene, undecylene, dodecylene, octadecylene, ethylenoxyethylene, methyleneoxybutylene, ethylenethioethylene, ethylene-N-methyliminoethylene or 1-methylalkylene.

11. A liquid crystalline mixture according to claim 1, wherein said radical of formula II contains only one group $Z^1$ or $Z^2$ which differs from a single bond.

12. A liquid crystalline mixture according to claim 1, wherein said mixture contains 2% of side-chain polymers of formula I.

13. A liquid crystalline mixture according to claim 1, wherein said mixture contains 5% of side-chain polymers of formula I.

14. A liquid crystalline mixture according to claim 1, wherein said side-chain polymer is
   poly-[4-(4-(trans-4-propylcyclohexyl)-phenyloxy)-butyl] methacrylate;
   poly-[6-(4-(trans-4-propylcyclohexyl)-phenyloxy)-hexyl] methacrylate;
   poly-[4-(4-(trans-4-pentylcyclohexyl)-phenyloxy)-butyl] methacrylate;
   poly-[4-(trans,trans-4'-propylbicyclohexyl-4-ylmethyl)-butyl] methacrylate; or
   a copolymer of 4-(4-(trans-4-propylcyclohexyl)-phenyloxy)-butyl methacrylate and 4-(4'-cyanobiphenyl-4-yl)-butyl methacrylate.

* * * * *